US012170432B2

(12) United States Patent
Chahrour

(10) Patent No.: US 12,170,432 B2
(45) Date of Patent: Dec. 17, 2024

(54) DIELESS CRIMPING TOOL

(71) Applicant: AIRLANE TECHNOLOGIES - SARL, Le Vesinet (FR)

(72) Inventor: Wael Chahrour, Le Vesinet (FR)

(73) Assignee: BLACK & DECKER INC., New Britain, CT (US)

( * ) Notice: Subject to any disclaimer, the term of this patent is extended or adjusted under 35 U.S.C. 154(b) by 543 days.

(21) Appl. No.: 17/387,257

(22) Filed: Jul. 28, 2021

(65) Prior Publication Data

US 2022/0021170 A1 Jan. 20, 2022

Related U.S. Application Data

(63) Continuation of application No. 15/696,763, filed on Sep. 6, 2017, now Pat. No. 11,108,205.

(60) Provisional application No. 62/397,987, filed on Sep. 22, 2016.

(51) Int. Cl.

| | |
|---|---|
| ***H01R 43/048*** | (2006.01) |
| ***B21D 39/04*** | (2006.01) |
| ***B25B 27/10*** | (2006.01) |
| ***H01R 43/042*** | (2006.01) |

(52) U.S. Cl.

CPC ....... *H01R 43/0486* (2013.01); *B21D 39/048* (2013.01); *B25B 27/10* (2013.01); *H01R 43/0428* (2013.01)

(58) Field of Classification Search

CPC ...... B21D 39/048; B21D 7/06; H01R 43/042; H01R 43/0424; H01R 43/0428; H01R 43/0486

See application file for complete search history.

(56) References Cited

U.S. PATENT DOCUMENTS

| | | | | |
|---|---|---|---|---|
| 3,154,981 | A * | 11/1964 | Mcdurmont | H01R 43/0424 81/304 |
| 2003/0079513 | A1* | 5/2003 | Miyamoto | H01R 43/0428 72/19.9 |
| 2011/0247506 | A1* | 10/2011 | Frenken | B30B 15/16 100/43 |
| 2014/0007642 | A1* | 1/2014 | Westley | H01R 43/0427 72/402 |
| 2016/0016222 | A1* | 1/2016 | Bungter | H01R 43/042 29/515 |

FOREIGN PATENT DOCUMENTS

| | | | |
|---|---|---|---|
| WO | WO-2016005838 A1 * | 1/2016 | B21D 39/048 |

* cited by examiner

*Primary Examiner* — Teresa M Ekiert

(74) *Attorney, Agent, or Firm* — Adan Ayala

(57) ABSTRACT

A crimping tool with a housing, a motor, a switch connected to the motor for activating the motor, a pump driven by the motor, a piston driven by the pump, an indenter operably connected to the piston, and a tool head connected to the housing, wherein a workpiece can be disposed between the tool head and the indenter. A current sensor is connected to the motor for sensing current flowing through the motor. A processor receives current data from the current sensor, the processor analyzing the current data to determine completion of a crimping operation and/or an error condition. A display connected to the processor can indicate completion of a crimping operation and/or an error condition.

3 Claims, 3 Drawing Sheets

DIELESS CRIMPING TOOL

CROSS-REFERENCE TO RELATED APPLICATIONS

The present application is a continuation of U.S. patent application Ser. No. 15/696,763, filed Sep. 6, 2017, entitled DIELESS CRIMPING TOOL now U.S. Pat. No. 11,108,205, which claims priority under 35 USC 119 from U.S. Application No. 62/397,987, filed Sep. 22, 2016, entitled DIELESS CRIMPING TOOL, both of which are wholly incorporated by reference in their entirety.

FIELD OF THE INVENTION

The present subject matter relates to a die less crimping tool, and particularly to a four point indenter dieless crimping tool.

BACKGROUND

Crimping tools are known which include multiple members or "indenters" that, upon activation of the tool, are urged against a member to be crimped such as a wire lug. Typically, such tools include four (4) indenters that are each directed radially inward. Upon tool activation, three (3) of the indenters are radially displaced toward the crimp target. The fourth indenter is stationary. The general assembly for this type of tool is described and illustrated in U.S. Pat. No. 3,154,981 and U.S. Publ. No. 2014/000742, which are hereby incorporated in full by reference.

Sometimes the crimp target falls between the indenters, resulting in an incomplete or interrupted crimp operation, or a faulty crimp. Accordingly, a need remains for a crimping tool that can detect such faulty crimp.

DESCRIPTION

Figure 1:
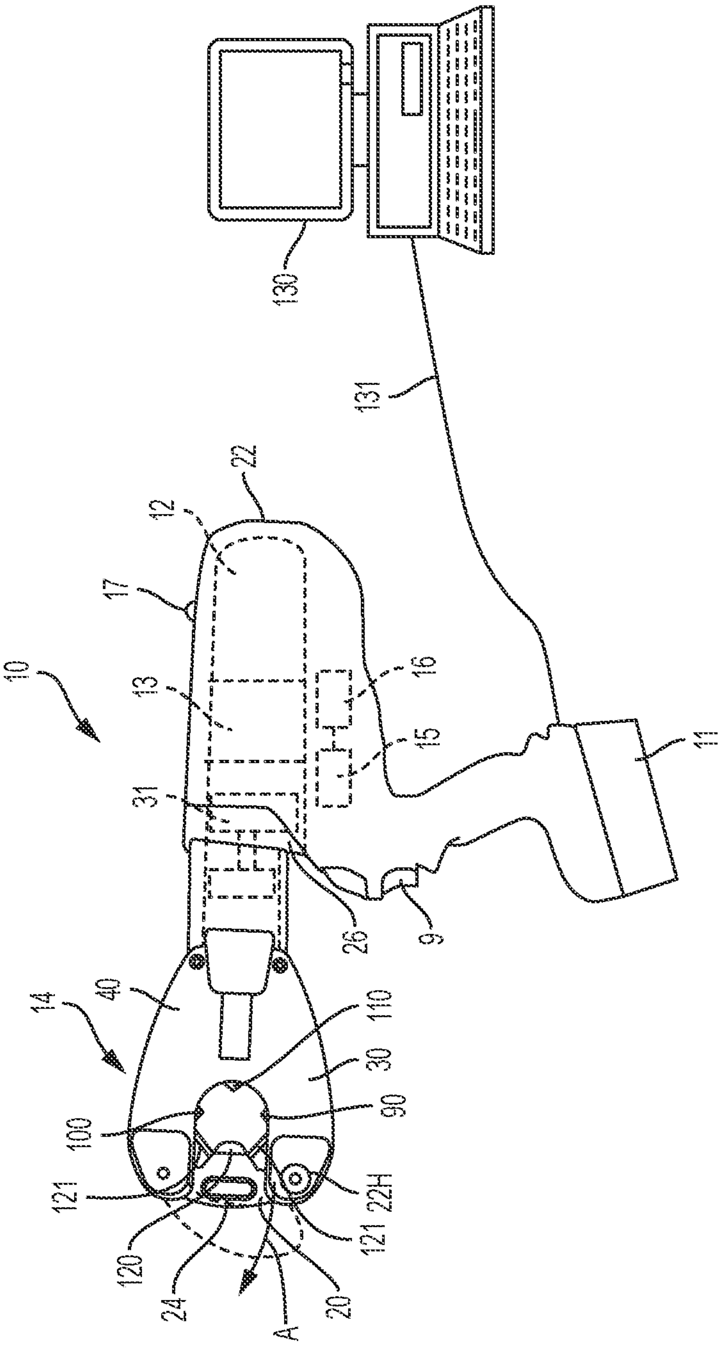
FIG. 1 is a side view of a dieless crimping tool.
Figure 2:
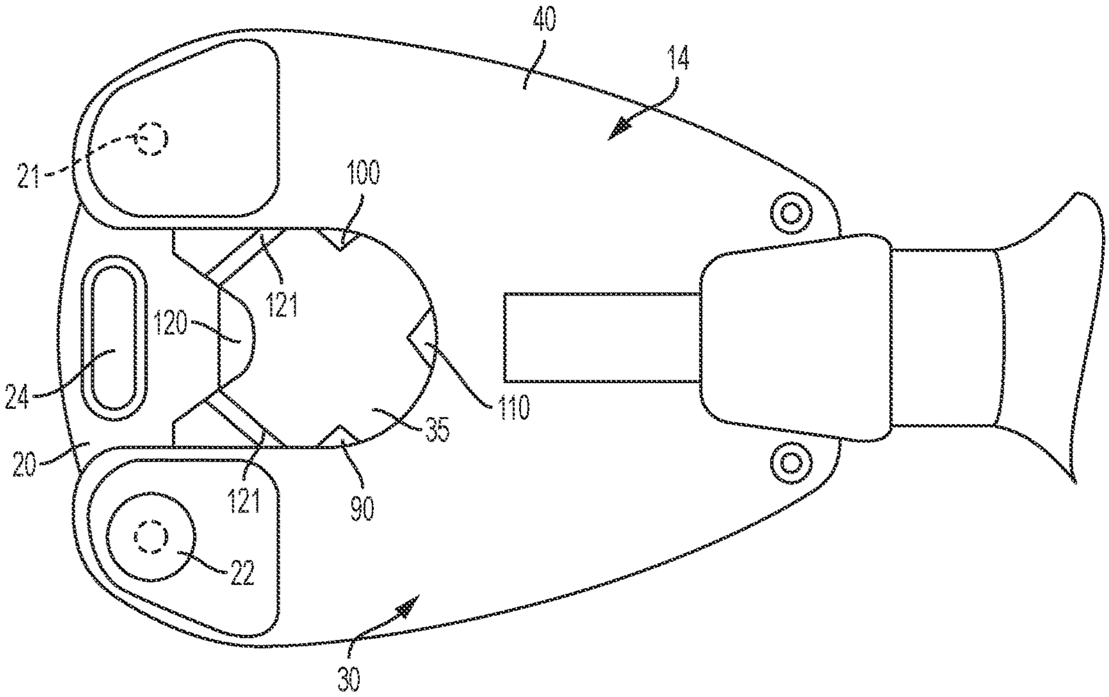
FIG. 2 is a side view of the tool head.

FIG. 1 illustrates a crimper 10 comprising a tool head 14. This crimper 10 comprises an electric motor 12, a pump 13 driven by the motor 12, and a housing 22 defining a cylinder 26 therein. An extendable piston 31 is disposed within the cylinder 26.

Motor 12 may be powered by a battery pack 11 when an on/off switch 9 is activated. When such switch 9 is activated, the pump 13 preferably provides pressurized hydraulic fluid to the piston cylinder 26, causing the piston 31 to extend from the housing 22 to thereby actuate the tool head 14 for crimping a work piece, such as an electrical connector.

Persons skilled in the art will recognize that the crimper 10 is preferably a power tool, but may be alternatively a hand held tool which is manually actuated by pivotal movement of an actuator handle relative to the tool body. It will be appreciated that the tool heads of the present subject matter can be used in combination with powered tools and tool systems. Moreover, although the tool heads of the present subject matter are primarily contemplated for use with hydraulic tools, both manual and powered; it will be understood that the tool heads could also be adapted for use with tools or tool systems that do not utilize hydraulics.

Crimper 10 may have a display 17 for communicating information to a user. Display 17 may include a liquid crystal display, a light emitting diode display, and/or at least one light emitting diode.

FIG. 1 illustrates a tool head 14 according to the present subject matter. The tool head 14 comprises a latch 20 selectively positionable on a frame 30. Latch 20 may be made of steel.

Latch 20 is preferably pivotally attached to frame 30 at one end of latch 20 via a pivot pin 21. Latch 20 may have a hole for receiving a locking pin 22 therethrough at its other end. Locking pin 22 is preferably captured by frame 30 so that the user can move locking pin 22 in and out of engagement with latch 20 but cannot remove locking pin 22 from frame 30. Persons skilled in the art will recognize that such result can be achieved by disposing a clip, such as an E- or C-clip (not shown), on locking pin 22 between latch 20 and frame 30.

With such arrangement, the user can pull on locking pin 22, unlocking latch 20. The user can then rotate latch 20 from the position shown in solid lines in FIG. 1 to the position shown in broken lines in FIG. 1 along direction A. Once the workpiece has been disposed within frame 30, the user can rotate latch 20 from the position shown in broken lines to the position shown in solid lines, and then push locking pin 22 towards latch 20, locking latch 20 in place.

Latch 20 may have a groove 24 formed on at least one side of latch 20 and preferably on both sides of latch 20. This will help the user grab latch 20 in order to rotate between the different positions.

Preferably frame 30 is hollow and has a front wall 40 and a rear wall 50. Front and rear walls 40, 50 are preferably connected by side walls (not shown). Frame 30 is preferably made of cast aluminum.

Front and rear walls 40, 50 preferably define an interior access region within which a plurality of indenters reside or are accessible. The tool head 14 may comprises a pair of opposing indenters and typically slidable indenters such as indenters 90, 100. The tool head 14 also preferably comprises a primary indenter 110 and an opposing supplemental indenter 120 engaged or otherwise associated with the latch 20. Each of the indenters 90, 100, 110, and 120 and their operation are described in greater detail herein.

Figure 3:
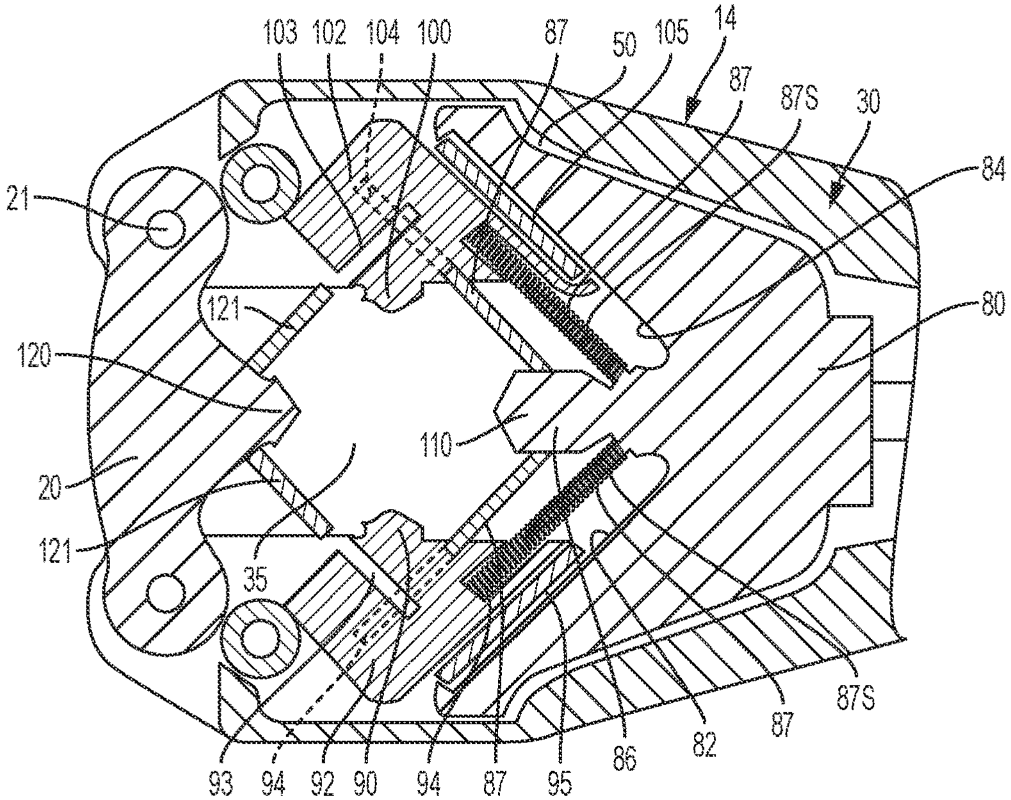
FIG. 3 is a cross-sectional view of the tool head along a centerline thereof.

Referring to FIG. 3, ramp member 80 is preferably moveably positioned between the front and rear walls 40, 50. The ramp member 80 preferably defines two opposing inclined ramp surfaces 82 and 84. A pair of indenter bases 92 and 102 are preferably disposed on the ramp surfaces 82 and 84, respectively. Preferably ball bearing assemblies 95, 105 may be disposed between ramp surfaces 82, 84 and corresponding bases 92, 102 to facilitate the movement therebetween.

As will be understood, the tool head 14 is actuated by displacing the ramp member 80 relative to the frame 30 and toward the nose region of the frame 30. Thus, upon displacement of the ramp member 80 toward latch 20, each of the indenter bases 92 and 102, carrying indenters 90 and 100, respectively, are displaced toward one another and toward the interior access region 35 defined by the frame 30, due to the inclined ramp surfaces 82 and 84.

The ramp member 80 preferably includes an outwardly extending member 86 which serves as a base for the primary indenter 110. In addition, as mentioned before, the latch 20 preferably carries the supplemental indenter 120.

It is advantageous to provide a mechanism to stop the crimp target from falling between the indenters. Such mechanism may include several protrusions or pins extending between the different indenters and/or their corresponding bases. For example, latch 20 may have at least one (and preferably two) protrusions or pins 121 extending therefrom. Pins 121 may be disposed adjacent indenter 120. Pins 121 may be slidably received within channels 93, 103 of corresponding bases 92, 102.

Similarly, member 86 may have at least one (and preferably three) protrusions or pins 87 extending therefrom. Pins 87 may be disposed adjacent indenter 110. Pins 87 may be slidably received within channels 94, 104 of corresponding bases 92, 102.

Persons skilled in the art will recognize that the pins preferably prevent crimp targets from falling between indenters. In addition, having pins slide within channels will assist in the crimping movement of indenters 90, 100.

Springs 87S may be provided adjacent to or around pins 87 to provide biasing forces between ramp member 80 and bases 92, 102.

Persons skilled in the art will recognize that it would be useful to provide crimper 10 with a means to detect faulty or incomplete crimps. Crimper 10 may have a sensor, such as current sensor 15, to sense a condition related to the crimping process, and a processor, controller or microcontroller 16, which preferably receives data from the current sensor 15 and analyzes it.

Preferably current sensor 15 senses the current flowing through motor 12 during the crimping process. Processor 16 preferably receives such current data and analyze it to determine whether the crimping process was properly completed or whether there was an issue in the crimping process resulting in a faulty crimp.

Figure 5:
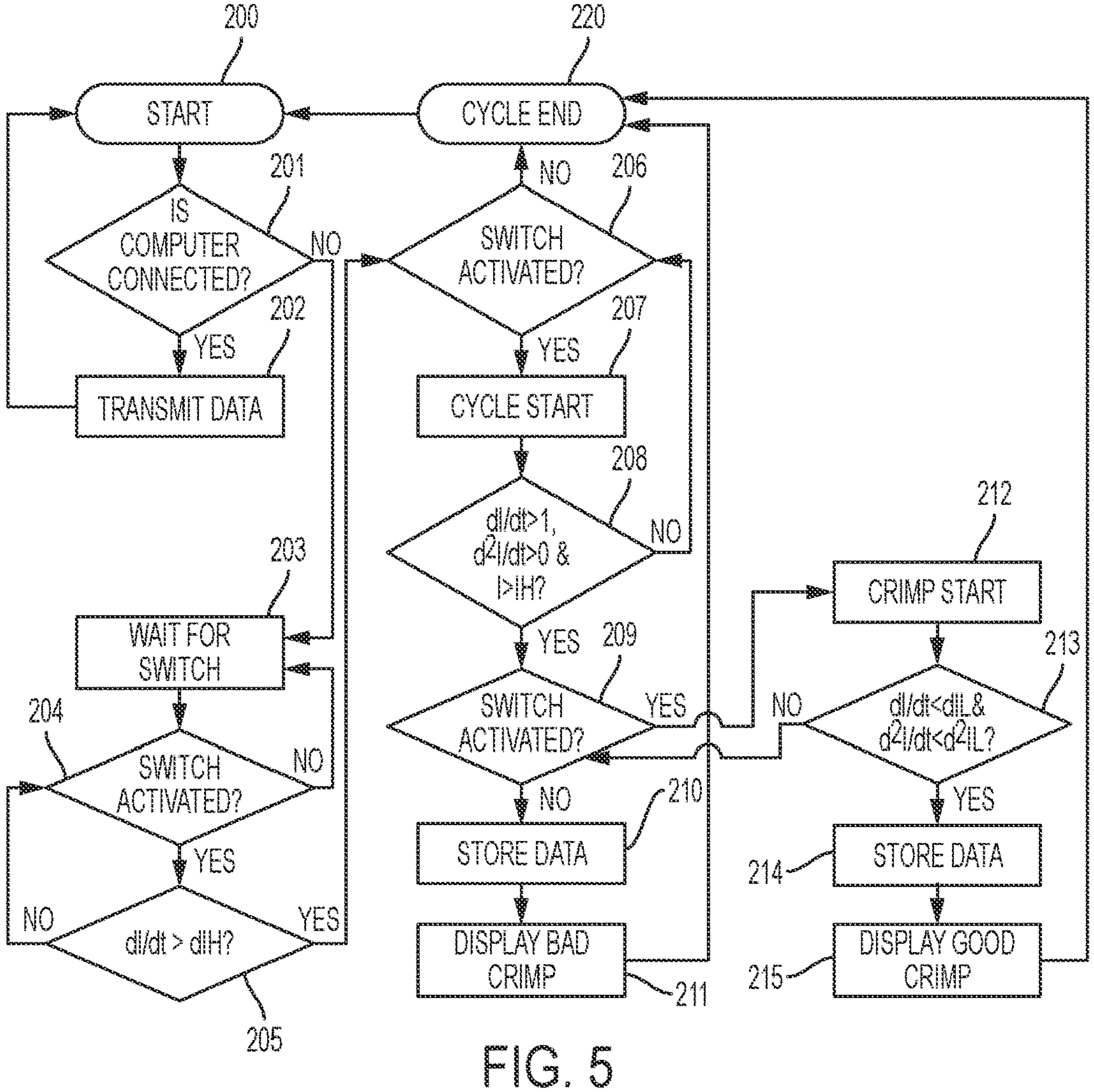
FIG. 5 is a flowchart showing two processes incorporated in an exemplary crimping tool.

FIG. 5 is a flowchart illustrating the processes followed by processor 16. The process begins at step 200 when crimper 10 is turned on (or battery pack 11 is connected to the crimper 10). Processor 16 may check whether crimper 10 is connected to a computer 130 (step 201) as shown in FIG. 1. Persons skilled in the art will recognize that the crimper 10 may be connected to the computer 130 wirelessly via a Bluetooth® connection for example, or via cable 131, such as a USB cable. Persons skilled in the art will also recognize that computer 130 may be a personal computer, or any other type of computing device, such as a smart phone or tablet.

If crimper 10 is connected to a computer 130, processor 16 and/or computer 130 can begin a transmission of stored data from crimper 10 to computer 130 (step 202). Computer 130 may use such stored data to analyze different crimping processes, prepare reports on the number of crimping cycles performed in certain dates, etc. Such reports may include the results on such crimping cycles, the associated data such as estimated crimping force, current, temperature, etc. Processor 16 and/or computer 130 may also begin a transmission of data, including firmware upgrades, software upgrades, etc., from computer 130 to crimper 10.

If crimper 10 is not connected to computer 130, processor 16 may wait for switch 9 to be activated (step 203). Once switch 9 is activated, processor 16 will check that switch 9 continues to be activated in order to begin the crimping process (step 204). If switch 9 does not continue to be activated, processor 16 will not continue the crimping process and instead continue to monitor switch 9 until it is further activated.

If switch 9 continues to be activated, processor 16 will monitor the first current derivative dI/dt and check whether it has reached a predetermined threshold dIH (step 205). If first current derivative dI/dt has not reached threshold dIH, processor 16 will preferably continue monitoring the first current derivative dI/dt until has reached threshold dIH.

Figure 4:
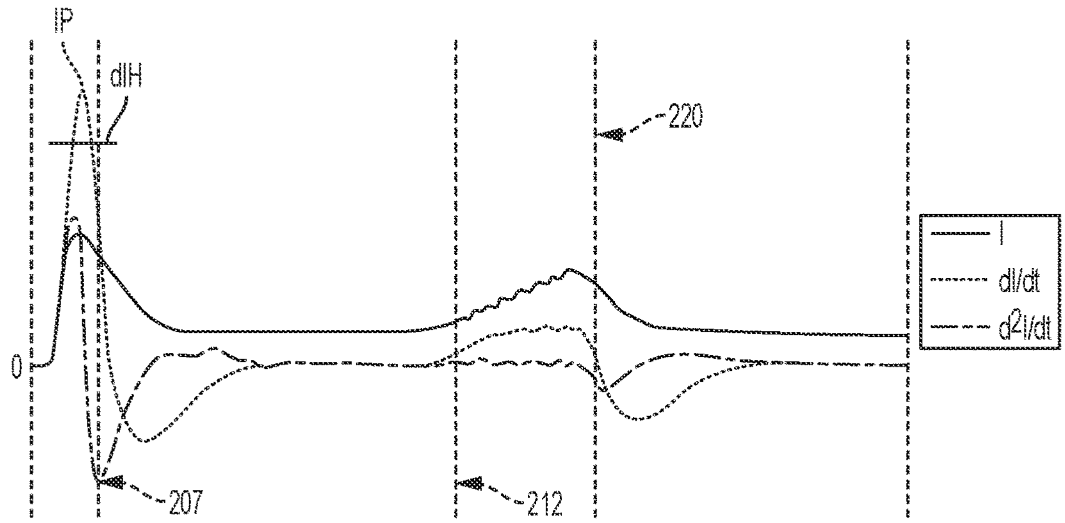
FIG. 4 is a graph showing current (I), the first derivative (dI/dt) thereof, and the second derivative ($d^2I/dt$) thereof, during an exemplary crimp cycle.

Referring to FIGS. 4-5, once the first current derivative dI/dt has reached threshold dIH, processor 16 will check that switch 9 continues to be activated (step 206). If switch 9 does not continue to be activated, processor 16 will end the crimping process (step 220), resetting crimper 10 as necessary.

If switch 9 continues to be activated, the crimping cycle can start (step 207). Processor 16 will preferably monitor the current I, the first current derivative dI/dt and the second current derivative $d^2I/dt$. In particular, processor 16 may check whether the first current derivative dI/dt is larger than 1, whether the second current derivative $d^2I/dt$ is larger than zero, and/or whether the current I is larger than a predetermined threshold IH (step 208).

If any or all of those conditions are met, processor 16 will check that switch 9 continues to be activated (step 209). If switch 9 does not continue to be activated, processor 16 will store the data for the present cycle (step 210), activate display 16 to indicate that the present crimp is bad (step 211), and end the crimping process (step 220), resetting crimper 10 as necessary. Preferably the stored cycle data will include start time of the cycle, crimp status, maximum current reached during cycle, estimated maximum output force reached during cycle, battery voltage, battery temperature, and/or any error data.

If switch 9 continues to be activated, the crimping portion of the cycle can start (step 212). As motor 12 drives pump 13 to move piston 31, a cable disposed within frame 30 will be crimped with increasing pressure, causing current I to climb as shown in FIG. 4.

During such period, processor 16 will check whether first current derivative dI/dt is below a predetermined threshold dIL and/or whether the second current derivative $d^2I/dt$ is below a predetermined threshold $d^2IL$ (step 213). If any or all of those conditions are met, processor 16 will store the data for the present cycle (step 214), activate display 16 to indicate that the present crimp is good (step 215), and end the crimping process (step 220), resetting crimper 10 as necessary. Preferably the stored cycle data will include start time of the cycle, crimp status, maximum current reached during cycle, estimated maximum output force reached during cycle, battery voltage, battery temperature, and/or any error data.

Persons skilled in the art will recognize that the different thresholds dIH, IH, dIL and/or $d^2IL$ are preferably programmed at the factory when crimper 10 is being constructed. Each crimper 10 may be tested during construction. The values of the different thresholds dIH, IH, dIL and/or $d^2IL$ can be adjusted depending upon the results from such tests.

For example, the value of threshold dIH may be selected to be a percentage (e.g., about 60%) of the maximum positive first current derivative reached during the crimping cycle or around the start-up current peak IP (FIG. 4). Similarly, the value of threshold IH can be selected to be a percentage (e.g., about 70%) of the maximum current (IM) reached during the crimping cycle or around the start-up current peak IP. In like manner, the value of thresholds dII and $d^2IL$ may be selected to be a percentage (e.g., about 60%) of the maximum negative first current derivative and maximum negative second current derivative reached after the maximum current IM is reached during the crimping cycle.

Such programming of thresholds may also be done when servicing or repairing crimper 10. Preferably, crimper 10 will be tested after service/repair, allowing the repair person to use the information gathered from such test to recalculate and program the thresholds dIH, IH, dIL and/or $d^2$IL.

Persons skilled in the art will recognize that such thresholds may be programmable by connecting crimper 10 to computer 130. In addition to transmitting the threshold data from computer 130 to crimper 10, computer 130 may also transmit date/time data for such recalibration. In this manner, when crimper 10 is connected to computer 130 at a later time, computer 130 would be able to display and/or prepare a report showing the latest recalibration date, the number of crimp processes conducted since such recalibration date, etc.

The description of the invention is merely exemplary in nature and, thus, variations that do not depart from the gist of the invention are intended to be within the scope of the invention. For example, persons skilled in the art will recognize that crimper 10 is typically considered a dieless crimper. Nonetheless, the improvements described herein may also be applicable to died crimpers and press tools. Such variations are not to be regarded as a departure from the scope of the invention.

What is claimed is:

1. A crimping tool comprising:
- a housing,
- a motor disposed within the housing,
- a switch connected to the motor for activating the motor,
- a pump driven by the motor,
- a piston driven by the pump,
- an indenter operably connected to the piston,
- a tool head connected to the housing, wherein a workpiece can be disposed between the tool head and the indenter,
- a current sensor connected to the motor for sensing current flowing through the motor,
- a processor receiving current data from the current sensor, the processor analyzing the current data to determine at least one of completion of a crimping operation and an error condition, and
- a display connected to the processor for indicating at least one of completion of a crimping operation and an error condition;
- wherein the processor monitors at least one of the first derivative of the current data and the second derivative of the current data.

2. The crimping tool of claim 1, further comprising a memory connected to the processor for storing at least one of the current data, crimp completion determinations and error determinations.

3. The crimping tool of claim 1, further comprising a battery pack attachable to the housing for providing power to the motor.

* * * * *